United States Patent [19]

Candy et al.

[11] 4,313,173
[45] Jan. 26, 1982

[54] LINEAR INTERPOLATOR

[75] Inventors: James C. Candy; Bruce A. Wooley, both of Tinton Falls, N.J.

[73] Assignee: Bell Telephone Laboratories, Incorporated, Murray Hill, N.J.

[21] Appl. No.: 158,246

[22] Filed: Jun. 10, 1980

[51] Int. Cl.³ ............................................. G06F 15/34
[52] U.S. Cl. .................................................. 364/723
[58] Field of Search ................. 364/723, 577; 318/573

[56] References Cited

U.S. PATENT DOCUMENTS

| | | | |
|---|---|---|---|
| 3,109,092 | 10/1963 | Lott et al. | 364/723 |
| 3,748,447 | 7/1973 | Hajicek et al. | 364/723 |
| 4,006,314 | 2/1977 | Condon et al. | 179/15 BS |

OTHER PUBLICATIONS

Cappellini et al. "A New Sample Interpolator of Linear Type" *IEEE Trans. on Instrumentation & Measurement* Aug. '72, pp. 293–94.

Vrkowitz "Parallel Realizations of Digital Interpolation Filters for Increasing the Sampling Rate" *Proceedings 1974 IEEE International Symposium on Circuits & Systems* 1974, pp. 16–19.

Ohno et al. "Voiceband Analog-PCM Conversion System Using Delta Modulation" *IEEE 1976 Communications Conference*, vols. I, II & III 1976, pp. 31-22 to 31-26.

*Primary Examiner*—David H. Malzahn
*Attorney, Agent, or Firm*—Barry H. Freedman

[57] ABSTRACT

An interpolator is arranged to form an increment for each interpolation interval by dividing the difference between the interpolator input and output by a number N indicating the desired number of output samples in the interval. During each interval, the increment is repeatedly added to each output to form the next output.

12 Claims, 5 Drawing Figures

LINEAR INTERPOLATOR

TECHNICAL FIELD

The present invention relates to interpolators generally and, in particular, to a linear interpolator for deriving an integral number N of samples with values which are functions of the values of an input signal at the beginning and end of each interpolation interval.

BACKGROUND OF THE INVENTION

Digital transmission and switching systems traditionally have decoded Nyquist rate PCM signals directly and then used analog filters to smooth the resulting pulse amplitude modulation. There is now increasing incentive to replace the analog filters with digital filters in order to provide greater dynamic range in both encoder and decoder, and thus provide range for additional management functions such as gain control, hybrid balancing, echo suppression and conferencing.

One digital decoding procedure that has been proposed raises the sample rate of the digital input signal with digital circuits which generate extra sample values. Thereafter, demodulation at the high sample rate eliminates the need for analog filters at the output, and permits the use of only a few uniformly spaced analog levels to represent output amplitudes.

While various techniques for increasing the frequency of the input samples have been proposed, it has been generally found most efficient to raise the sample rate in several stages, rather than all at once. One technique for raising the frequency uses simple repeating, whereby input words enter a register from which they are each read several times in succession. This register output is then smoothed by a low pass filter. Alternatively, the word rate can also be increased by simple linear interpolation, wherein several new sample values are inserted between successive input samples, and such interpolation is the subject of the present invention. If performed efficiently, interpolation smooths the signal, attenuating all images of the baseband except those adjacent to the desired output sampling frequency.

At present, interpolation is often performed by computing the difference between successive input samples, dividing the difference by the desired number of output samples to be generated per input interval, and incrementing an accumulator which stores the previous interpolator output. Interpolators of this type are usually extremely sensitive to offsets which may occur during the processing, since the error continues indefinitely once it has been inserted in the accumulator loop. In addition, the accumulator must be initialized each time it is turned on in order to eliminate any residual errors, thereby adding to the complexity of the required circuitry.

In view of the foregoing, it is the broad object of the present invention to provide an improved interpolator in which offsets are not indefinitely accumulated and in which initialization is not difficult. Other objects are to provide an interpolator which is both efficient and easily fabricated using integrated circuit technology.

SUMMARY OF THE INVENTION

In accordance with the present invention, it is recognized that at the end of eato the value of the input sample. Accordingly, the interpolator output value, stored in an accumulator loop, is fed back to a subtraction circuit which also receives the interpolator input. The difference is divided to form the desired increment, which is repeatedly added to the value held in the accumulator over the interval. With this arrangement, offset in the accumulator is eliminated at the end of each interpolation interval, when the input and output are forced to track. This design also provides automatic initialization, since after the end of any cycle of operation, any residual error value in the accumulator has been eliminated.

BRIEF DESCRIPTION OF THE DRAWING

The foregoing features, and the details and advantages of the present invention will be better understood by consideration of the following detailed description when read in light of the accompanying drawing in which.

DETAILED DESCRIPTION

Interpolation as used herein is defined mathematically in terms of a series of input samples $X_i$ (i=0, 1, 2 ...) occurring at a frequency $f_0$, and an output sample series $Y_{Ni+n}$ (n=0, 1, 2 ... N−1) which occurs at a frequency N times greater than the input. The value of each interpolated output sample is given by:

$$Y_{Ni+n} = X_i + \frac{n}{N}(X_{i+1} - X_i), \quad (1)$$

indicating that each output is a function of the previous ($X_i$) and succeeding ($X_{i+1}$) inputs, with the increment $$\frac{n}{N}(X_{i+1} - X_i)$$

to the previous input being proportional to the product of:

(a) the difference ($X_{i+1} - X_i$) between successive inputs, and (b) a proximity factor (n/N) indicating how close the output sample is to the beginning (or end) of the interval defined by the input pulses $X_i$ and $X_{i+1}$. Equation (1) may be rewritten as:

$$Y_{Ni+n} = \left(\frac{N-n}{N}\right) X_i + \frac{n}{N}(X_{i+1}) \quad (2)$$

which indicates that each output is a function of the previous and succeeding inputs, with the dependence changing linearly over the interval n=0, 1, 2 ... N−1. Indeed, the sum of the factors N−n/N and n/N is unity, so that each interpolator output is a "weighted average" of $X_i$ and $X_{i+1}$.

Figure 1:
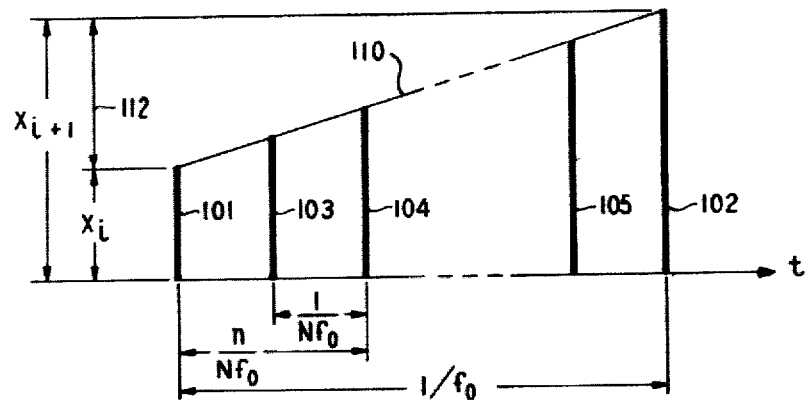
FIG. 1 graphically illustrates linear interpolation as performed by the present invention.

Linear interpolation is illustrated graphically in FIG. 1. Successive input samples 101 and 102 define an interpolation interval of duration $1/f_0$ in which N−1 *new* samples are to be inserted. A total of N output samples thus comprise each output sequence, and these are spaced $1/Nf_0$ seconds apart. The values of the inserted samples (such as samples 103, 104 and 105) lie along a straight line 110 which is constructed between the values $X_i$ and $X_{i+1}$ of input samples 101 and 102, respectively. The difference between any inserted sample (e.g., sample 104) and the initial sample 101 is a fraction of the total difference 112 between the input samples $X_i$ and $X_{i+1}$ and depends on the location or position $n/Nf_0$ of the particular sample (104) in relation to the total interpolation interval $1/f_0$.

A straightforward circuit for realizing a linear interpolation is suggested by rewriting equation (1) in recursive form, and substituting $Y_{Ni}$ for $X_i$, since both values are equal. Thus:

$$Y_{Ni+n} = Y_{Ni} + \frac{n}{N}(X_{i+1} - X_i). \quad (3)$$

Figure 2:
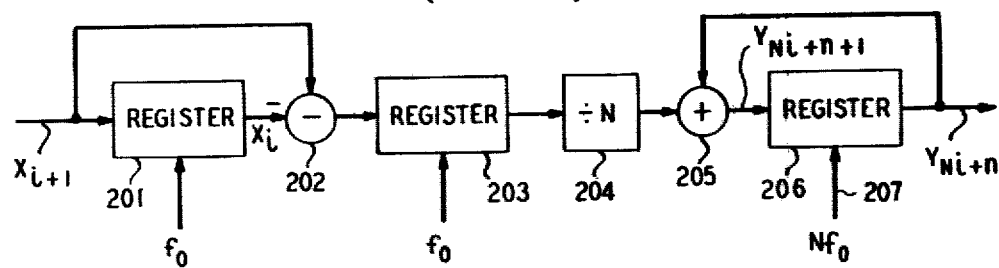
FIG. 2 is a block diagram of a prior art interpolator circuit.

Equation (3) may be implemented by a prior art interpolator of the type shown in FIG. 2, wherein the input is applied to a first register 201 clocked at the input sample frequency $f_0$. The difference between input $(X_{i+1})$ and the previous input $X_i$ (derived from the output of register 201) is formed in a subtraction circuit 202 and stored in a second register 203 which is also clocked at the $f_0$ rate. The difference is divided by N in a divider circuit 204, which supplies an increment $$\frac{1}{N}(X_{i+1} - X_i)$$

to an accumulator comprising an adder 205 and a third register 206. This register is clocked at the desired output rate $Nf_0$ via timing pulses on line 207, so that the increment is repeatedly added to the accumulated value. The output of register 206 forms the output of the interpolator, which is fed back to one input of adder 205 so that succeeding increments may be accumulated.

While the interpolator of FIG. 2 gives the desired result, any error that occurs in the accumulator loop formed by register 206 and adder 205 remains there indefinitely. This can lead to excessive error buildup, and seriously affect performance.

Figure 3:
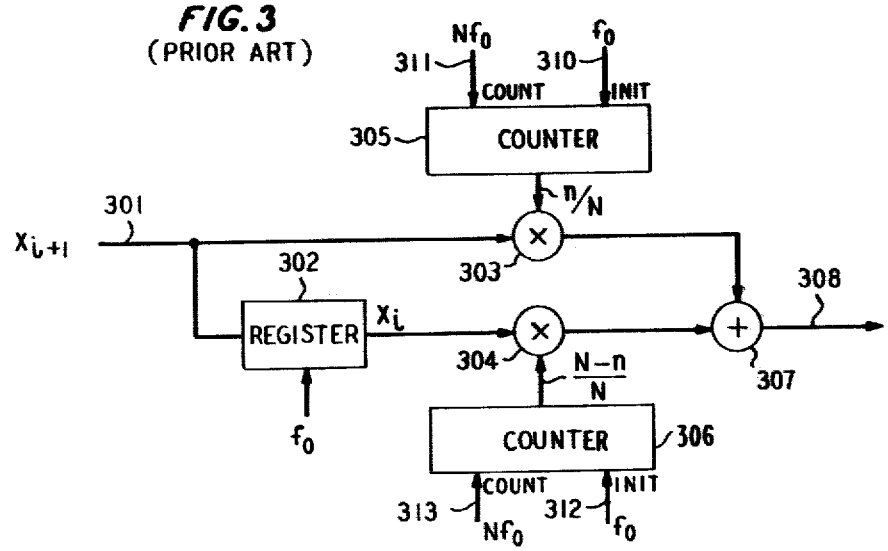
FIG. 3 is another prior art interpolator circuit.

To avoid this problem, a second prior art approach, illustrated in FIG. 3, has been used. Here, the input on line 301 is applied directly to the first input of multiplier 303 and to the first input of multiplier 304 via a register 302 clocked at the input rate $f_0$. In this way, multiplier 304 receives the present input value $X_i$ at the same time that multiplier 303 receives the next input value $X_{i+1}$.

The interpolator of FIG. 3, operating in accordance with equation (2), is designed to multiply $X_i$ by $(N-n)/N$ and $X_{i+1}$ by $n/N$. These coefficients are developed in a pair of counters 305 and 306, the outputs of which are supplied to the second inputs of multipliers 303 and 304, respectively. Counter 305 is initialized or cleared at the beginning of each interpolation interval by a pulse (at rate $f_0$) on line 310, and is thereafter incremented in the amount of $1/N$ at each occurrence of a clock pulse on line 311. This clock operates at the desired output frequency $Nf_0$. Counter 306 is initialized at a unity value by a pulse (at rate $f_0$) on line 312, and is thereafter decremented in the amount $1/N$ at each occurrence of a clock pulse on line 313. This clock also operates at the output frequency $Nf_0$. The outputs of multipliers 303 and 304 are combined in an adder circuit 307 to yield the desired output on line 308.

The interpolator of FIG. 3 can be somewhat simplified by arranging counters 305 and 306 for incrementing or decrementing their respective outputs by integer values, and by thereafter dividing the output of adder 307 by N. Indeed, if N is a power of 2, the division is simply a shift of the multibit output word. In addition, since the coefficients always add to unity, one counter may be replaced by a subtractor which is arranged to subtract the coefficient value output from the remaining counter from "1".

Despite these simplifications, the interpolator of FIG. 3 is still difficult and costly to implement in integrated circuit form, principally because of the large number of active elements associated with multipliers 303 and 304.

Figure 4:
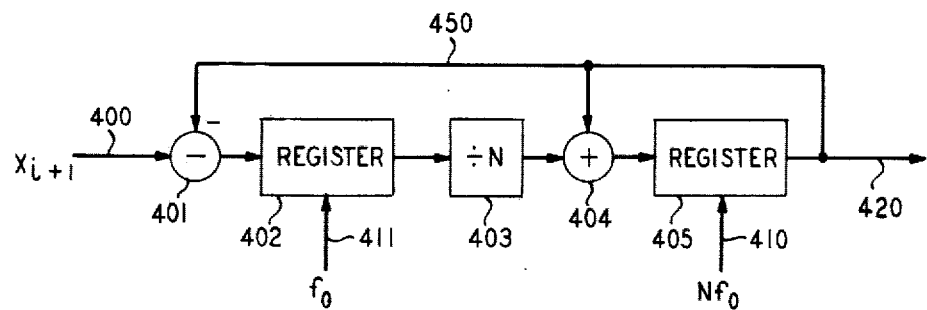
FIG. 4 is a block diagram of an interpolator constructed in accordance with the present invention.

An interpolator constructed in accordance with the present invention, shown in FIG. 4, avoids the problem of offset buildup experienced with the circuit of FIG. 2 and does not need the multipliers required with the circuit of FIG. 3. The circuit comprises first and second registers 402 and 405 (one less than required in the circuit of FIG. 2), a pair of adder/subtractor circuits 401 and 404, and a divide by N circuit 403 which may be implemented as a shift circuit when N is a power of 2 and the sample values being processed are multibit words.

The interpolator of FIG. 4 is based on the recognition that equation (3) may be rewritten as:

$$Y_{Ni+n} = Y_{Ni} + \frac{n}{N}(X_{i+1} - Y_{Ni}) \quad (4)$$

by substituting $Y_{Ni}$ for $X_i$ within the parenthesis. This equation, like equation (3) is recursive, so that adder 404 and register 405 together form an accumulator. The remaining circuitry generates an increment which is added to the previous interpolator output. This new value is then stored in register 405 until the next incrementation. The feedback used in the accumulator is accomplished by connecting the interpolator output on line 420 to one input of adder circuit 404, the output of which is input to register 405 to complete the accumulator loop. Register 405 is clocked by pulses on line 410 at the rate $Nf_0$, generated by a clock source, not shown.

The increment added to the accumulator loop is derived by forming the difference between the interpolator input $X_{i+1}$ on line 400 and the interpolator output on line 420, in a subtraction circuit 401. This difference changes at the rate $Nf_0$, every time a new output value is generated. However, the output of subtractor 401 is clocked into register 402 only at the end of each interpolation interval, so that the output $Y_{Ni}$ is used to represent the previous input $X_i$. The occurrence of each clock pulse at rate $f_0$, applied on line 411, causes register 402 to store the new difference $(X_{i+1} - Y_{Ni})$ which equals $(X_{i+1} - X_i)$. The appropriate fraction of this difference is provided using division circuit 403, which can be arranged to shift the multibit output of register 402 $(\log N/\log 2)$ bits to the right. The output of circuit 403 is the desired increment, which is applied to the second input of adder circuit 404.

Figure 5:
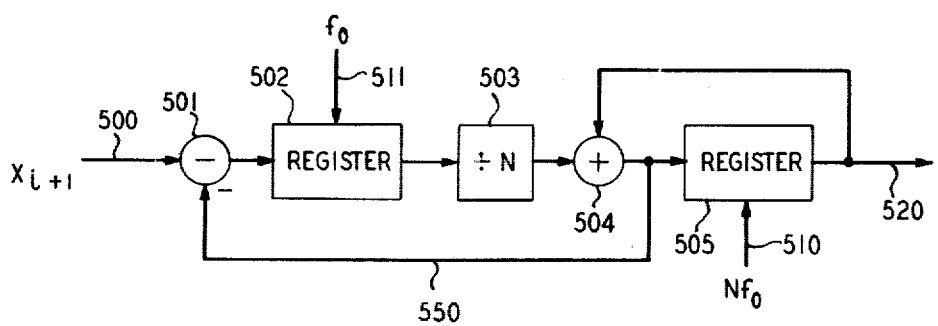
FIG. 5 is another embodiment of an interpolator circuit in accordance with the instant invention.

The timing used in the interpolator of FIG. 4 may be slightly modified, if desired, as shown in FIG. 5. This circuit again includes an accumulator consisting of adder circuit 504 and register 505 connected within a feedback loop. On each occurrence of a clock pulse on line 510, an increment is added to the present accumulator contents, and the result restored in the register. The output of the interpolator and the value fed back and used to form the increment is taken from the output of adder circuit 504, rather than from the register output as in FIG. 4. This arrangement has the effect of advancing the interpolator output slightly, since the input to register 505 leads its output by the interval $1/Nf_0$. However, no effect is felt on the remaining circuitry, since the difference formed by subtractor 501 is clocked into register 502 only once per interval, upon the occurrence of an $f_0$ clock pulse on line 511. As before, the increment added to the accumulator loop is formed by dividing the output of subtractor 501 by N in a divider 503.

Several desired advantages occur as a result of the unique interpolator arrangement in accordance with the invention. First, any offset or error which occurs in the accumulator is automatically eliminated, since a negative feedback connection (450 in FIG. 4, 550 in FIG. 5) exists between the accumulator and the interpolator input. The accumulator does not have to be initialized, since at the end of a single interval, any error has been dissipated.

This self-correcting ability is illustrated by assuming that, for some reason, the interpolation output $Y_{Ni}$ deviates from the desired value $X_i$ by an error $\epsilon$. This deviation is negatived in subtractor 401 or 501, divided by N, and combined, N times, with the contents of the accumulator loop over the next interpolation interval. Thus, at the end of the interval, $\epsilon/N$ has been subtracted N times from the previous deviation, cancelling out the error. The circuits of FIGS. 4 and 5 use one less register than is required in the prior art circuit of FIG. 2, and no multipliers are needed. Integrated circuit fabrication is easily realized.

For an input frequency of 32 kHz and an output frequency of 128 kHz (N=4), the impulse response of a linear interpolator of the type shown in FIGS. 4 or 5 has a triangular shape, with the z-transform given by:

$$H_I(z) = \frac{1}{16}\left[\frac{1-z^{-4}}{1-z^{-1}}\right]^2 \quad (5)$$

The frequency response of the interpolator is thus:

$$|H_I(f/f_1)| = \left|\frac{\text{sinc}(4f/f_1)}{\text{sinc}(f/f_1)}\right|^2 \quad (6)$$

Since $|H_I(28 \text{ kHz}/128 \text{ kHz})| = -33.6$ dB and $|H_I(36 \text{ kHz}/128 \text{ kHz})| = -37.5$ dB, the interpolator clearly provides adequate rejection of baseband images at 32, 64 and 96 kHz, as is desired.

Those skilled in the art will appreciate that certain changes may be made in the specific implementations illustrated herein without departing from the spirit and scope of the present invention, as defined in the following claims.

We claim:

1. Apparatus for generating a series of N interpolated samples during each of a series of interpolation intervals defined by successive input samples, comprising:
   means for forming the difference between each input sample and an output of said apparatus which represents the preceding input sample,
   means for dividing said difference by N to form an increment, and
   means for repeatedly adding said increment to said output of said apparatus to generate the next output.

2. The invention defined in claim 1 wherein said difference forming means includes:
   a subtraction circuit for subtracting said output from said input, and
   a register for receiving said difference at the beginning of each interpolation interval.

3. The invention defined in claim 1 wherein said difference is a multibit word and said dividing means includes a shift circuit.

4. The invention defined in claim 1 wherein said adding means includes a register, an adder circuit for adding the contents of said register to one of said increments, and means for clocking the sum output from said adder into said register.

5. The invention defined in claim 4 wherein said clocking means is arranged to operate N times during each of said interpolation intervals.

6. Apparatus for generating a plurality of output samples having values interpolated from the values of successive input samples which define an interpolation interval, comprising:
   means (401, 402, 403) for forming an increment representing a fraction of the difference between the values of successive input samples, and
   means (404, 405) repeatedly adding said increment to each of said output samples to form the next output sample,
   characterized in that
   said increment forming means includes subtraction means (401) arranged to form said difference by subtracting the value of one of said output samples from the value of the input sample marking the beginning of the next interpolation interval.

7. The invention defined in claim 6 wherein said adding means includes:
   an adder circuit (404) for summing said increment with one of said output samples, and
   a second register (405) clocked at rate $Nf_0$ for receiving said sum and providing said next output sample.

8. The invention defined in claim 6 wherein said input samples occur at rate $f_0$, said output samples occur at rate $Nf_0$, and said increment forming means further includes a first register (402) clocked at rate $f_0$ for receiving said difference formed by said subtraction means.

9. The invention defined in claim 8 wherein said increment forming means further includes a division circuit (403) for dividing the output of said first register (402) by the factor N.

10. Apparatus for deriving an integral number N of interpolated samples with values $Y_{Ni+n}$ in response to successive input samples $X_i$ and $X_{i+1}$, such that $$Y_{Ni+n} = X_i + \frac{n}{N}(X_{i+1} - X_i)$$

where n=0, 1, 2 ... N−1, i=0, 1, 2 ... said apparatus comprising:
   means for forming for each interpolation interval an increment which represents a fraction of the difference between said successive input samples; and
   means for repeatedly adding said increment to an accumulator arranged to provide the output of said apparatus;
   characterized in that
   said increment forming means includes:
   means for forming said difference between successive input samples using an input sample $X_{i+1}$ and an output sample of said apparatus which represents the previous input $X_i$ to said apparatus.

11. Apparatus for generating a series of output samples having values interpolated between successive pairs of input samples, comprising:
   means for forming a difference value representing the difference between each of said successive pairs of input samples,
   means for adding a fraction of said difference to each output sample to generate the next output sample,
   means for repeating said addition a plurality of times during each interval formed by successive pairs of input samples, and
   means for feeding back one of said output samples to said difference forming means, at the end of each of said intervals.

12. A method of generating a series of N interpolated samples during each of a series of interpolation intervals defined by successive input samples, comprising the steps of:
   forming the difference between each input sample and an interpolated output sample which represents the preceding input sample,
   dividing said difference by N to form an increment, and
   repeatedly adding said increment to said interpolated output sample to generate the next output.

* * * * *